UNITED STATES PATENT OFFICE.

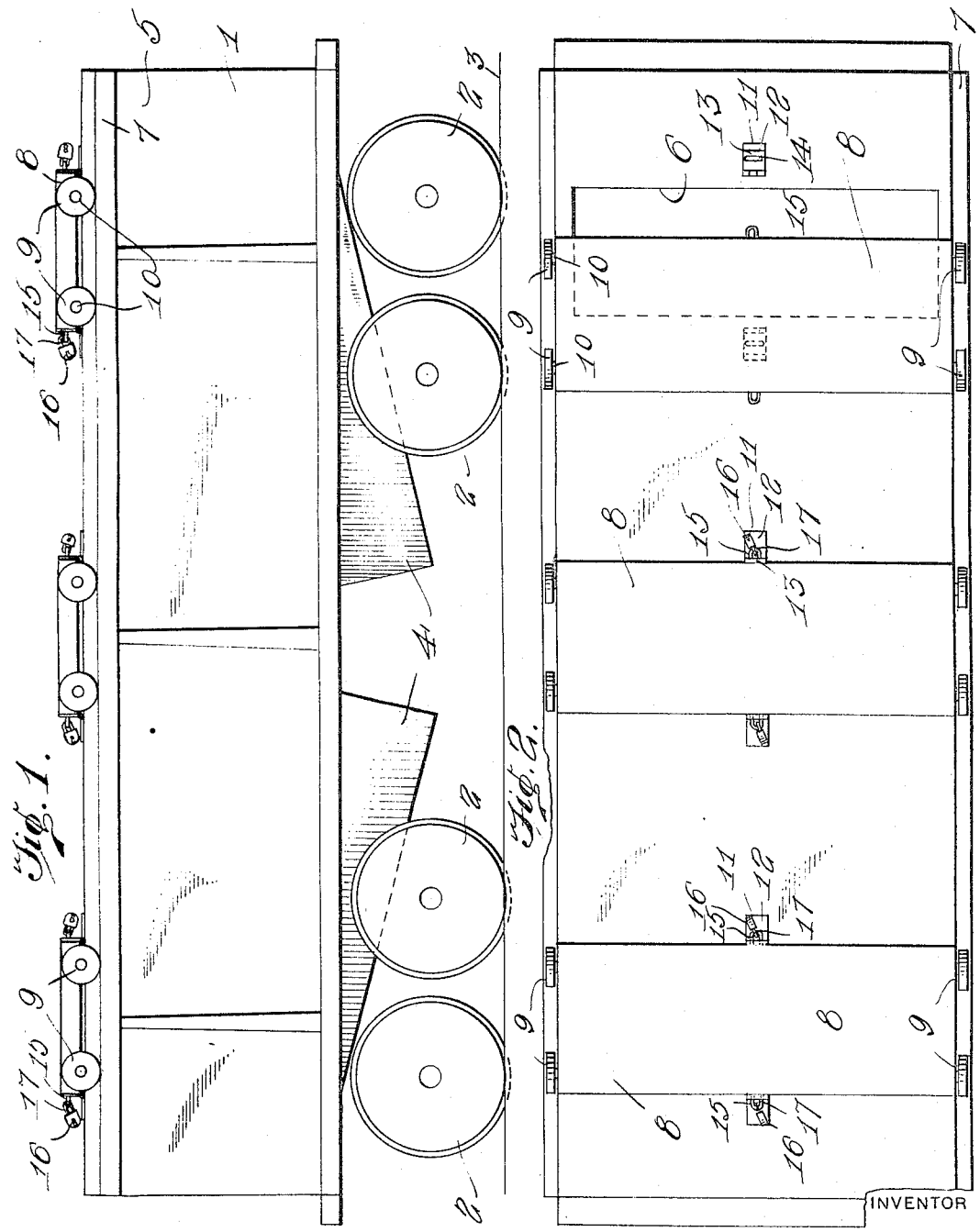

ALFRED F. BREST, OF WILLIAMSPORT, PENNSYLVANIA.

CAR-BODY.

1,189,535.  Specification of Letters Patent.  Patented July 4, 1916.

Application filed October 21, 1915. Serial No. 57,180.

*To all whom it may concern:*

Be it known that I, ALFRED F. BREST, a citizen of the United States, residing at Williamsport, in the county of Lycoming and State of Pennsylvania, have invented certain new and useful Improvements in Car-Bodies, of which the following is a specification.

My invention relates to car bodies and more particularly to a cover for a car body.

The primary object of my invention resides in the provision of a cover for car bodies embodying movably mounted means for removable association with openings in the cover, locking means being removably associated on the movably mounted means for removably holding these means in position over the openings to prevent surreptitious persons from having access to the interior of the car body, providing a car body wherein coal or the like may be safely carried from one point to another without danger.

Another object of my invention resides in the provision of a track for association with the sides of the car body for supporting rollers, which are in turn associated with movably mounted doors on the top of the cover, said doors closing the openings in the cover when so desired.

Another object of my invention resides in the provision of a novel folding locking means for removable association with the doors for maintaining the doors in position over the openings to prevent access to the interior of the car body.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claims forming a part of this specification.

In the drawings:—Figure 1 is a side elevational view of the invention showing the doors in locked position. Fig. 2 is a top plan view of my invention, one of the doors being shown in an opened position.

Referring more particularly to the drawings in which similar reference numerals designate like or corresponding parts throughout the different views, I provide a car body 1 which is preferably of the usual rectangular configuration, the body being supported by rotatably mounted wheels 2 which operate on a track bed 3. The bottom of the body has chutes 4 slanting from the outer ends toward the center as illustrated to advantage on Fig. 1. These chutes may be closed in any suitable manner. It is to be understood that the construction described forms no essential part of my invention, it being simply shown and described in order that the invention may be fully understood. It is also obvious that the chutes might as well project from the sides of the body, no claim being made to the manner or position of the same.

Connected to the top of the body is my improved cover 5 the latter being preferably rectangular in configuration and arranged to conform with sides and ends of the body. The cover is provided at uniformly spaced intervals with a plurality of transversely extending rectangular openings 6 which will thus constitute a means whereby the body of the car may be filled with suitable material. In order to removably close these openings and prevent surreptitious persons from having access to the interior of the body 1, I have provided a pair of tracks 7, one being arranged on each side of the body, preferably in alinement with the upper edge of the body and the lower edge of the cover. Rectangular doors 8 of a width similar to the width of the cover are arranged transversely on the cover to move longitudinally thereof through the medium of rollers 9, rotatably mounted on stub shafts 10, which project from the respective ends of the doors, said rollers operating on the track. These doors are of a width sufficient to close the openings and are normally adapted to move over the openings 6 to close the openings.

In order to removably maintain the doors above the openings I have provided a plurality of hasps 11, one section 12 of each of which is readily connected to the body of the cover adjacent the openings, the other section 13 of each hasp being provided with a slot 14 which is adapted to engage the eye 15 which projects from the adjacent side of the door. Suitable pad locks 16 have their shackles 17 associated with the eyes for removably holding the sections 13 of the hasp 11 in movable engagement with the respective sides of the doors.

The operation of my invention is as follows:—In order to fill one of the cars to which my improved cover is adapted, the pad locks 16 are disconnected from the eyes 15 to permit of the sections of the hasp being arranged in position on the body of the cover thus permitting the doors to be rolled away from the openings to the medium of the rollers 9 of the track 7. When a sufficient quantity has been placed in the car body the doors are rolled into position above the openings, the hinges associated with the eyes and the padlocks again applied. They remain in this position until the car reaches its destination, and prevent surreptitious persons from gaining access to the interior of the car body.

It is of course obvious that the material can be removed from the car through the medium of the chutes 4 which have suitable closed associations therefrom.

Although I have shown and described the preferred embodiment of my invention, I desire it to be understood that I am not to be limited to the exact details shown, however, I desire that great stress be laid upon the arrangement of the rollers rotatably mounted on the doors and operating on the track, for allowing the doors being removably arranged above the openings.

From the above description taken in connection with the accompanying drawings, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the general embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent is:—

1. A device of the character described including a rectangular car body, a cover on the upper edge of the body and provided with a plurality of uniformly spaced and transversely arranged openings, tracks secured longitudinally of the sides of the body and in alinement with the upper edges thereof, a plurality of rectangular doors arranged transversely of the cover for closing the openings, rollers rotatably mounted on the end edges of the doors operating on the tracks and arranged in close relation with the side edges of the cover to permit of and to guide the longitudinal movement of the doors, and means for removably locking the doors above the openings.

2. A closure for car bodies including a cover having a plurality of uniformly spaced openings therein, doors movably mounted on the cover and movable longitudinally to close the openings, staples secured to the side edges of the doors, a plurality of hasps each being formed of two hinge sections, one section of each hasp being secured to the top of the cover and the other sections being engageable with the adjacent hasps on the doors when the doors are arranged over the openings, a plurality of locks engageable with the staples for removably holding the movable sections in engagement with the sides of the doors, and the movable sections being foldable to engage the rigid sections when the locks are released to permit of the removal of the doors from over the openings.

ALFRED F. BREST.

Witnesses:
  C. W. Fell,
  Chas. Weber.